United States Patent
Asada et al.

(10) Patent No.: US 8,703,244 B2
(45) Date of Patent: Apr. 22, 2014

(54) PREPREG AND METHOD OF MANUFACTURING THE PREPREG

(75) Inventors: Shirou Asada, Aichi (JP); Hisao Koba, Aichi (JP); Akihiro Ito, Aichi (JP); Kazutami Mitani, Aichi (JP); Kimihiro Ikezaki, Aichi (JP); Koki Wakabayashi, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 805 days.

(21) Appl. No.: 12/138,729

(22) Filed: Jun. 13, 2008

(65) Prior Publication Data

US 2008/0248204 A1 Oct. 9, 2008

Related U.S. Application Data

(60) Division of application No. 10/531,876, filed on Apr. 19, 2005, now abandoned, which is a continuation of application No. PCT/JP02/11013, filed on Oct. 23, 2002.

(51) Int. Cl.
 *B05D 3/12* (2006.01)

(52) U.S. Cl.
 USPC .......................................... 427/370

(58) Field of Classification Search
 USPC ................ 427/430.1, 331, 355, 369, 370
 See application file for complete search history.

(56) References Cited

U.S. PATENT DOCUMENTS

| | | | | |
|---|---|---|---|---|
| 3,814,647 A | * | 6/1974 | Scher et al. | 156/219 |
| 4,092,198 A | * | 5/1978 | Scher et al. | 156/222 |
| 4,213,930 A | | 7/1980 | Goodrich et al. | |
| 4,891,408 A | * | 1/1990 | Newman-Evans | 525/113 |
| 5,104,718 A | | 4/1992 | Asada et al. | |
| 5,589,246 A | | 12/1996 | Calhoun et al. | |
| 6,391,436 B1 | * | 5/2002 | Xu et al. | 428/298.1 |
| 6,764,741 B2 | | 7/2004 | Kawasumi et al. | |

FOREIGN PATENT DOCUMENTS

| | | | |
|---|---|---|---|
| EP | 1 338 406 A2 | 8/2003 | |
| EP | 1 541 312 A1 | 6/2005 | |
| JP | 59-146836 | 8/1984 | |
| JP | 1-200914 | 8/1989 | |
| JP | 2-227212 | 9/1990 | |
| JP | 4-89209 | 3/1992 | |
| JP | 7-276358 | 10/1995 | |
| JP | 7-276360 | * 10/1995 | ............. B29B 15/00 |
| JP | 11-322977 | 11/1999 | |
| JP | 2002-327076 | 11/2002 | |
| WO | WO 02/088231 A1 | 11/2002 | |

OTHER PUBLICATIONS

Thorfinnsone et al, 31$^{st}$ International SAMPE Symposium, 1986, 99. 480-490.

Thorfinnson et al, 32$^{nd}$ International SAMPE Symposium, 1987, pp. 1500-1509.

* cited by examiner

*Primary Examiner* — Michael Cleveland
*Assistant Examiner* — Tabatha Penny
(74) *Attorney, Agent, or Firm* — Oblon, Spivak, McClelland, Maier & Neustadt, L.L.P.

(57) ABSTRACT

A reinforced-fiber sheet impregnated with a matrix resin, a protective film having an irregular surface is applied to at least one surface of the reinforced-fiber sheet impregnated with the matrix resin such that the irregular surface faces the reinforced-fiber sheet. The thus-formed reinforced-fiber sheet covered with a protective film is kept at a temperature of 50-130° C. for four hours or more such that the viscosity of the impregnated resin is 100-10000 poise.

11 Claims, 5 Drawing Sheets

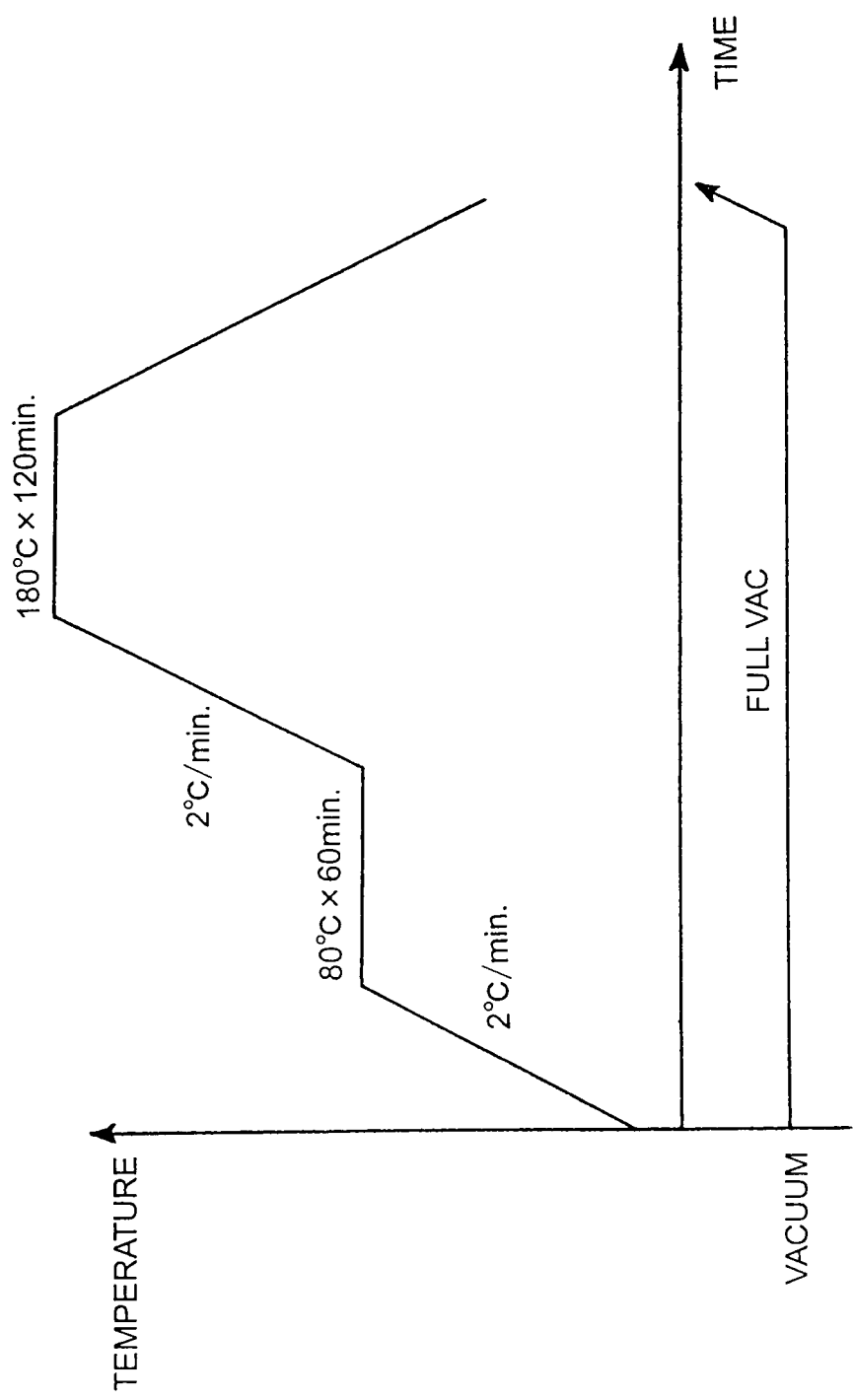

PREPREG AND METHOD OF MANUFACTURING THE PREPREG

This application is a Divisional application of Ser. No. 10/531,876 filed Apr. 19, 2005, now abandoned, which is a Continuation application of international application PCT/JP02/11013 having a filing date of Oct. 23, 2002.

FIELD OF THE INVENTION

The present invention relates to a prepreg used when producing a fiber-reinforced composite molded article and to a method of producing the prepreg, and, particularly, to a prepreg used preferably for vacuum bagging molding and to a method of producing the prepreg.

BACKGROUND ART

A prepreg used in the production of a fiber-reinforced composite molded article is usually provided with its one side supported by releasable paper coated with silicone for the purpose of retaining the shape thereof. Also, the other side of the prepreg is covered with a protective film such as a polyethylene film to retain the tack of the prepreg or to prevent foreign substances such as dust from adhering thereto.

However, when one side or both sides of prepreg are covered with these sheet-like materials such as releasable paper and protective film, the resin contained in the prepreg is deviated to the sheet-like material side by the interaction such as surface tension on the sheet-like material, which makes both surfaces of the prepreg resin-rich.

The prepreg with both surfaces being resin-rich has the characteristics that even if the sheet-like material is peeled off after the prepreg is cut into a desired pattern to process the prepreg into a composite molded product to be intended, the state that the surfaces of the prepreg are resin-rich is left unchanged just after the sheet-like material is peeled off. If these prepregs with resin-rich surfaces are merely laminated in plural, air is trapped between two prepregs.

If the prepreg is cured in such a state that air is trapped between these prepregs, the obtained molded article is inferior in integration. Alternatively, the traces of the trapped air form voids, which become stress-concentrated portions under some stress and therefore the function of the prepreg is impaired: for example, the strength required for a composite molded article is obtained insufficiently.

In order to avoid such a disadvantage, it is necessary to prevent air from being trapped between the laminated prepregs. There is, for example, a method in which when laminating prepregs by using, for example, an auto lay-up machine, prepregs are pressed to each other under heating and pressure to let the air out of the space between prepregs to laminate. However, this auto lay-up machine is very expensive, which also affects the price of a resulting composite molded product. Also, this auto lay-up machine is not suitable for use in the case of laminating in a complicated form and is therefore limited in its use. For these reasons, the current operation of laminating prepregs is still actually carried out by operators manually.

Therefore, a method is proposed in which talc is stuck to the surface of a prepreg to prevent resins from being stuck plane-wise directly to each other on the surfaces of the prepregs, thereby reducing the stickiness of the resin itself to prevent air trapping. This method of sticking talc is effective to reduce tack characteristics of a prepreg. However, it merely reduces the tack characteristics, and because the talc is finally contained in a molded article, an unintended increase in weight is brought about in the case of producing a large molded product. Also, it is desirable to stick the talc evenly in consideration of the mechanical characteristics of a molded article. In this method, however, there is the case where spotting is caused to localize the talc. In this case, there is a fear that the mechanical characteristics of a molded article are deteriorated.

In another method of preventing layer voids as disclosed in theses "Production of void free composite parts without debulking" and "Degree of impregnation of prepregs—Effects on porosity" made public in the 31st (held in Apr. 7 to 10, 1986) and the 32nd (held in Apr. 6 to 9, 1987) International SAMPE Symposium respectively, a prepreg is adopted in which a reinforced-fiber sheet is not impregnated entirely with resin but one surface of the reinforced-fiber sheet is locally impregnated with the resin. It is described in these theses that this prepreg in which one surface thereof is locally impregnated with the resin can prevent the generation of voids because, when this prepreg is cured, conduits are formed which permit the escape of the air and volatile materials trapped between layers when laminating plural prepregs.

This prepreg in which one surface of a reinforced-fiber sheet is locally impregnated with the resin is produced using a method in which a reinforced-fiber sheet is interposed between releasable paper coated with the resin weighed in advance and releasable paper non-coated with the resin, followed by fastening and pressing from both sides.

Meanwhile, in a method disclosed in Japanese Patent Laid-Open Publication No. 2-227212, a number of concave grooves along the molding direction of a prepreg are formed on the surface of the prepreg impregnated sufficiently with resin by using a roller having a irregular portion in its circumferential direction. It is described in this publication that in the case of molding by vacuum bagging molding in which a plurality of the above prepregs are laminated in the condition that the direction of the concave grooves are fixed, the concave grooves on the surface of the prepreg function as conduits allowing the escape of the air and volatile materials trapped between layers and it is therefore possible to prevent the generation of layer voids.

However, in the case of the prepreg in which the resin is localized on one surface thereof and which is produced by the above double-film method, the releasable paper non-coated with the resin must be peeled off to use the prepreg in the state of a structure constituted of a prepreg and the releasable paper which is coated with resin and supports the prepreg. At this time, the releasable paper which is non-coated with the resin is in direct contact with the reinforced fibers. Therefore, when the releasable paper is peeled off, single yarns are drawn from the reinforced-fiber sheet and these drawn single yarns entangle other single yarns, resultantly bringing about the disadvantage that an opening is formed in the entangled part, which is sometimes a serious defect of a product.

Also, no resin exists on the other surface of the prepreg and therefore, when prepregs are laminated in such a manner that the sides on which no resin exists are made to face each other, they cannot be laminated in the condition that these sides are stuck to each other, leading to inferior handling characteristics of the prepreg.

When the upper side and lower side are laminated such that the upper side concave groove intersects with the lower side concave groove in the method in which the concave groove is formed on the surface of the prepreg as disclosed in Japanese Patent Laid-Open Publication No. 2-227212, the shapes of the concave grooves are kept, so that the concave grooves serve as air conduits, allowing the trapped air to flow, resulting in the production of a void-free molded article. However, when the upper and lower layers are laminated such that the concave grooves are substantially parallel to each other, the concave groove on the surface of the prepreg is easily clogged with the backside material of the prepreg laminated thereon and therefore the air is trapped on the contrary with the result that voids are easily formed.

The present invention has been made to solve the above conventional problem and it is an object of the present invention to provide a prepreg which is free from a phenomenon that air is trapped between the layers of the prepreg to generate voids when the prepregs are laminated to produce a molded product, has excellent handling characteristics and can produce a molded product having any complicated shape and also to provide a method of producing the prepreg.

DISCLOSURE OF THE INVENTION

In order to solve the above problem, the fundamental structure of the present invention is a prepreg produced by impregnating a reinforced-fiber sheet with a matrix resin, being characterized in that the prepreg comprises a continuous resin layer which exists in an inside thereof, and at least one surface of one side thereof is constituted of a resin-impregnated part where an impregnated resin substantially exists and a fiber part where an impregnated resin dose not substantially exist.

The aforementioned reinforced-fiber sheet means sheets in which reinforced fibers such as carbon fibers and glass fibers are arranged in the same directions and reinforced-fiber woven/knit fabrics or nonwoven fabrics.

In the prepreg of the present invention, a fiber part where an impregnated resin dose not substantially exist is formed on at least one surface of the prepreg. Therefore, a plurality of the aforementioned prepregs are laminated manually without using an expensive apparatus such as an auto lay-up machine and also without carrying out debulking. Even when these prepregs are cured by a conventional method, for example, a vacuum bagging molding method, no void is generated between layers and a molded article provided with desired mechanical strength can be obtained.

This is because the aforementioned fiber part on one surface of the prepreg serves as a conduit through which the air trapped between layers and volatile materials produced during molding are allowed to escape. It is to be noted that the aforementioned fiber part is filled with the resin because the resin around the fiber part flows to the fiber part until the resin is completely cured during molding.

Moreover, the aforementioned one surface is sufficiently impregnated with the resin and therefore a resin-impregnated part where an impregnated resin substantially exists is formed. The adhesion between the upper and lower layers when these layers are laminated is properly obtained, which improves the handling characteristics of the prepreg.

The present invention may take a sea-island structure in which the aforementioned fiber part constitutes a sea portion and the aforementioned resin-impregnated part constitutes an island portion.

Such a structure in which the fiber part constitutes a sea portion and the resin-impregnated part constitutes an island portion permits the escape of the air and volatile materials trapped between layers to the outside efficiently and effectively. Preferably, the area of the island portion is 1 to 80%, and more preferably 2 to 50% of the total area of the one surface of the one side of the prepreg.

When the area of the island portion is less than 1% of the total area of the one surface, there is a fear that the adhesion between the upper and lower layers when these layer are laminated is insufficient and it is therefore difficult to handle the prepreg. Also, when the area of the island portion exceeds 80% of the total area of the one surface, the fiber part is instantly clogged by the fluidization of the surrounding resin when molding, so that the air and volatile materials trapped between layers are allowed to escape incompletely, arousing a fear that remaining air forms voids inside of a molded article.

Preferably, the center distance between adjacent island portions is 1 to 10 mm, and more preferably 2 to 5 mm. When the island portions are formed such that the center distance between the adjacent island portions is in the above range, the air and volatile materials trapped between layers are allowed to escape externally smoothly and completely.

The fundamental structure adopted to produce such a prepreg in the present invention is based on a method of producing a prepreg, the method comprising impregnating a reinforced-fiber sheet with a matrix resin so as to form a continuous resin layer at least in an inside thereof; and applying a protective film having an irregular surface to at least one surface of one side of the reinforced-fiber sheet impregnated with the matrix resin.

Further preferably, only a convex portion of the irregular surface is brought into contact with the reinforced-fiber sheet impregnated with the matrix resin. Although no particular limitation is imposed on the material of the reinforced fiber which may be used in the present invention, carbon fibers, glass fibers, alamide fibers, boron fibers and steel fibers and the like may be used as the reinforced fiber. Among these fibers, carbon fibers are preferably used because of good mechanical characteristics after molding. As this carbon fibers, both polyacrylonitrile (PAN) type carbon fibers and pitch type carbon fibers may be used.

The reinforced-fiber sheet used in the present invention is not particularly limited in its shape and arrangement. Examples of the reinforced-fiber sheet include those put in the form of a sheet, cloth (woven fabric), tow, mat, knit or sleeve, in which long fibers are arranged in the same direction.

Also, no particular limitation is imposed on the material of the protective film and the material of the protective film may be changed appropriately corresponding to the type of matrix resin in consideration of the adhesion to the matrix resin. For example, a polyethylene film which is conventionally used may be used as the protective film.

Moreover, there is no particular limitation to the type of matrix resin. As the resin used in the present invention, thermosetting resins are preferable. Examples of the thermosetting resins include epoxy resins, polyester resins, vinyl ester resins, phenol resins, maleimide resins, polyimide resins and BT resins (manufactured by MITSUBISHI GAS CHEMICAL COMPANY, INC.) obtained by combining a cyanate ester with a bismaleimide resin. It is preferable to use epoxy resins.

As the epoxy resin, a bisphenol A-type epoxy resin, bisphenol F-type epoxy resin, biphenyl type epoxy resin, naphthalene type epoxy resin, dicyclopentadiene type epoxy resin and fluorenone type epoxy resin which are difunctional resins and combinations of these resins may be preferably used.

Further, tri- or more or polyfunctional epoxy resins may be used. As these polyfunctional epoxy resins, a phenol novolac type epoxy resin, cresol type epoxy resin, glycidylamine type epoxy resins such as tetraglycidyldiaminodiphenylmethane, triglycidylaminophenol and tetraglycidylamine, glycidyl ether type epoxy resins such as tetrakis(glycidyloxyphenyl) ethane and tris(glycidyloxymethane) and combinations of these resins are preferably used.

It is preferable to add a hardener to the matrix resin in the present invention. Examples of the hardener include aromatic amines such as diphenylmethane and diaminodiphenylsulfone, aliphatic amines, imidazole derivatives, dicyandiamide, tetramethylguanidine, thiourea addition amines, carboxylic acid anhydrides such as a methylhexahydrophthalic acid anhydride, carboxylic acid hydrazide, carboxylic acid amide, polyphenol compounds, novolac resins, polymercaptan and Lewis acid complexes such as trifluoride ethylamine complex.

Also, microcapsulated materials of these hardeners may be preferably used to improve the preserving stability of the prepreg. These hardeners may be combined with a proper hardening promoter to improve hardening activity. Preferable examples of the combination include a combination of dicyandiamide with a urea derivative such as 3-(3,4-dichlorophenyl)-1,1-dimethyl urea (DCMU) or an imidazole derivative as the hardening promoter and a combination of a carboxylic acid anhydride or novolac resin with a tertiary amine as the hardening promoter.

Also, these epoxy resin and hardener or a material obtained by pre-reacting a part of these materials may also be compounded in the matrix resin composition. There is the case where this method is effective to control the viscosity and to improve the preserving stability.

Further, in addition to the above structural elements of the matrix resin, a thermoplastic resin may be compounded for the purpose of controlling the viscosity of the resin and the handling characteristics of the prepreg. In this case, an appropriate resin is selected in consideration of the compatibility with the epoxy resin and taking into account avoiding an adverse influence on the physical properties of a composite material when it is made into the composite material. Preferable examples of the resin include a polyvinylformal, polyvinylbutyral, polyethylene oxide, polymethylmethacrylate, polyamide, polyester, polyether sulfone, polysulfone, polyetherimide and polyinmide and the like. Also, two or more of these resins may be combined.

Also, rubber particles, soluble rubbers or rubbers having a core-shell structure may be contained as additives. These additives are partly dissolved at least in a mother resin or are not dissolved but exist in the state of particles. In order to obtain a high-quality prepreg in the present invention, the particles are preferably pulverized or dissolved in advance so that particles having a particle diameter of about 50 μm or more are substantially not contained when these rubber materials exist in the state of particles.

In the production method of the present invention, first, the reinforced-fiber sheet is impregnated with the matrix resin by a conventional method. For example, the matrix resin is applied evenly to the surface of releasable paper and the reinforced-fiber sheet is applied to the surface of the resin to impregnate the sheet with the resin. In the prepreg produced by this method, the reinforced-fiber sheet is impregnated with the matrix resin in the condition that the matrix resin is localized on one side of the reinforced-fiber sheet, namely on the surface of the sheet on the side of the releasable paper.

Alternatively, the reinforced-fiber sheet may be sandwiched from both sides thereof by releasable paper coated evenly with the matrix resin to impregnate the reinforced-fiber sheet with the resin. The prepreg obtained by this method is entirely impregnated evenly with the resin. If the reinforced-fiber sheet is impregnated with the resin by these conventional methods, a continuous resin layer is formed at least in the inside.

Next, the irregular surface of the protective film having the irregular surface is applied to at least one of the surfaces of the prepreg. In the case where, for example, the releasable paper is applied to only one surface, it is preferable to apply the protective film to the other fiber-rich surface. Also, when the releasable paper is applied to both surfaces, at least the releasable paper applied to one surface is peeled off and the protective film is applied to the exposed surface.

The protective film is applied to the reinforced-fiber sheet in the condition that the convex portion thereof is in close contact with the sheet impregnated with the resin and the concave portion thereof is far from the sheet. At this time, the resin included in the reinforced-fiber sheet is attracted to the protective film side by surface tension at the portion where the convex portion of the protective film is in close contact with the sheet and that portion is resin-rich with the result that a resin-impregnated part where an impregnated resin substantially exists is formed. On the other hand, the position corresponding to the concave portion of the protective film is distant from the reinforced-fiber sheet impregnated with the resin and therefore the aforementioned surface tension does not act, so that the resin moves to the convex side or to the inside of the prepreg with the result that the position corresponding to the concave portion is a fiber part where an impregnated resin dose not substantially exist.

In the method of producing such a prepreg, an excellent prepreg whose surface is constituted of the aforementioned resin-impregnated part and the fiber part and is therefore free from the generation of voids during molding can be easily produced by only altering the protective film, which is usually applied to the surface of the prepreg when the prepreg is stored and conveyed, into the film having an irregular surface. Because an outstandingly big-scale apparatus is not required in this method, it has no influence on its production cost.

In the production method of the present invention which utilizes the contact with the irregular surface of the protective film and the surface tension of the resin, the development of a sea-island structure comprising the resin-impregnated part and the fiber part on the surface of the prepreg is a phenomenon which depends on the viscosity of the resin with time.

This implies that the viscosity of the matrix resin is kept at 10000 Poise or less for 4 hours or more in the situation where the protective film is applied to the reinforced-fiber sheet. This also implies that the temperature of the matrix resin is kept at 30 to 150° C. for 4 hours or more in the situation where the protective film is applied to the reinforced-fiber sheet.

If the impregnated resin is put in the state that it has a viscosity of a fixed value or less or put at a fixed temperature for 4 hours or more, the resin is moved sufficiently to the surface which is in contact with the convex portion to thereby form a resin-impregnated part and a fiber part distinctly.

Generally, the viscosity of the resin is dropped by raising the temperature to be kept at this time. Although this viscosity of the resin differs depending on the type of matrix resin, the temperature to be kept is preferably designed to be 30° C. or more. When the temperature is too high, there are the cases where the curing reaction of the resin becomes so fast that plenty of time required for the movement of the resin is not secured and where the tack characteristics of the prepreg when the prepreg is afterward stored at ambient temperature is impaired. Therefore, the temperature to be kept is made to be preferably 150° C. or less.

The irregular surface of the protective film is formed of a number of independent convex portions. The use of the protective film having such an irregular surface ensures the formation of a prepreg having a surface provided with a resin-impregnated part constituting an island portion and with a fiber part constituting a sea portion.

Further preferably, the irregular surface of the protective film is disposed with dispersing a number of convex portions uniformly on a surface of the film. The uniform dispersion of the convex portions leads to uniform presence of resin-impregnated parts relative to fiber parts on the surface of the obtained prepreg. Molded products formed from the prepregs resultantly have uniform resin density and fiber density. Although the convex portions are desirably dispersed uniformly for the above reason, these convex portions may be dispersed nonuniformly, of course.

Further preferably, a center distance between the adjacent convex portions is 1 to 10 mm, and more preferably 2 to 5 mm.

BRIEF DESCRIPTION OF THE DRAWINGS

FIG. 6 is a graph showing curing conditions.

BEST MODE FOR CARRYING OUT THE INVENTION

Embodiments of the present invention will be explained in detail with reference to the drawings.

Figure 1:
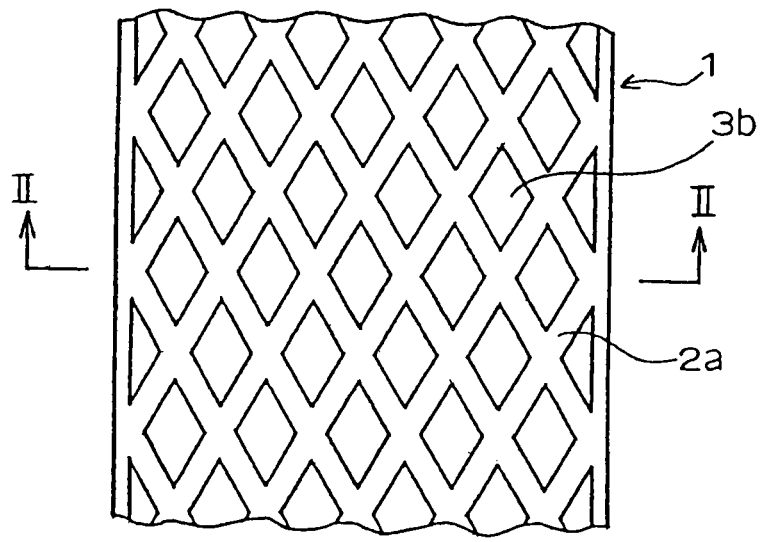
FIG. 1 is a plan view of a prepreg in a preferred embodiment of the present invention.
Figure 2:
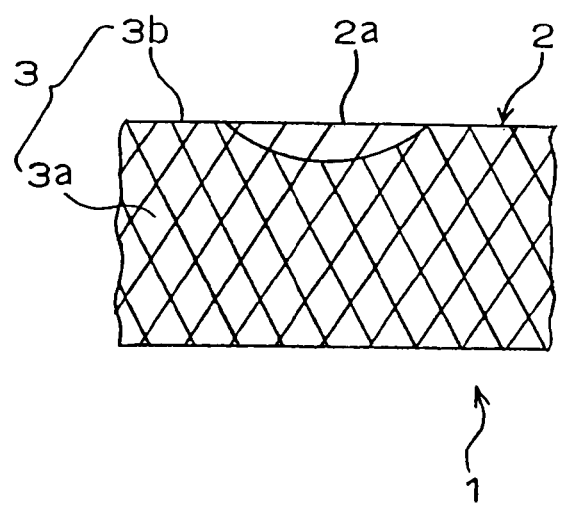
FIG. 2 is a sectional view taken along the line II-II in FIG. 1.

FIG. 1 is a plan view of a prepreg in a preferred embodiment of the present invention and FIG. 2 is a sectional view taken along the line II-II in FIG. 1.

The prepreg 1 is constituted of a reinforced-fiber sheet 2 and a matrix resin 3 with which the sheet 2 is impregnated. As the reinforced-fiber sheet, sheets in which reinforced fibers such as carbon fibers and glass fibers are arranged in the same direction and woven or nonwoven fabrics of reinforced fibers may be used.

The prepreg 1 is impregnated with the resin 3 locally on the backside thereof and a continuous resin layer 3a exists therein. Further, on the surface of the prepreg 1, the resin is sufficiently impregnated in the reinforced-fiber sheet and the prepreg 1 is constituted of a resin-impregnated part 3b where an impregnated resin substantially exists and a fiber part 2a where the resin dose not substantially exist and the above reinforced fiber is exposed.

The prepreg 1 has a sea-island structure in which the above fiber part 2a constitutes a sea portion and the above resin-impregnated part 3b constitutes an island portion, wherein the resin-impregnated part 3b exists independently. In this embodiment, the surface of the resin-impregnated part 3b has a rhomboid shape and the resin-impregnated parts 3b are regularly arranged herringbone-wise at equal intervals. The center distance between the adjacent resin-impregnated parts 3b is preferably 1 to 10 mm. Further, the area of the resin-impregnated part 3b which is the island portion is preferably 1 to 80% of the total surface area. In this case, the shape and arrangement of this resin-impregnated part 3b may be properly altered in its design corresponding to the fluidity and tack characteristics of the resin.

The production of the prepreg having such a structure comprises, first, impregnating one surface of the reinforced-fiber sheet with the matrix resin in such a manner as to form a continuous resin layer at least in the inside of the prepreg. For example, a fixed amount of the matrix resin is applied to the surface of the releasable paper, the reinforced-fiber sheet is supplied to the surface of the matrix resin and then the reinforced-fiber sheet is made to be impregnated with the resin using a means of passing a press roll, whereby a prepreg impregnated with the resin locally on one surface side can be obtained.

Alternatively, the reinforced-fiber sheet may be sandwiched from both sides thereof by releasable paper coated evenly with the matrix resin of a fixed amount and then, for example, a means of passing a press roll is used, whereby a prepreg impregnated with the resin on the entire surface thereof can be obtained.

In the case of the prepreg impregnated with the resin locally at least on one surface of the prepreg having a continuous resin layer at least in the inside, a protective film having an irregular surface is applied to the reinforced-fiber sheet such that the aforementioned irregular surface faces other surface side opposite to the side impregnated locally with the resin. At this time, only the convex portion of the irregular surface of the protective film is in close contact with the reinforced-fiber sheet.

In the situation where the protective film is applied to the reinforced-fiber sheet impregnated with the resin, the viscosity of the resin is kept at 1000 Poise or less for 4 hours or more, or the temperature is kept at 30 to 60° C. for 4 hours or more. In the reinforced-fiber sheet, the resin inside of the sheet is moved to the surface side by its surface tension at the portion where the convex portion is in close contact therewith.

As a result, on the surface of the reinforced-fiber sheet 1, as shown in FIG. 1, the portion with which the convex portion is in close contact is the resin-impregnated part 3b where the resin is sufficiently impregnated and the impregnated resin substantially exists and the portion corresponding to the concave portion of the protective film which the protective film is not in close contact with the resin is the fiber part 2a where the resin dose not substantially exist.

Such movement of the resin due to surface tension is observed even in a reinforced-fiber sheet which is entirely impregnated with the resin and the resin substantially exists on the entire surface. In the case of applying a protective film with irregular surface to the surface on which the resin exists entirely, the resin around a portion where the convex portion of the protective film is in close contact with the sheet moves to the portion on the reinforced-fiber sheet. The portion which is in close contact with the convex portion is sufficiently impregnated with the resin and becomes a resin-impregnated part where the impregnated resin substantially exists and the part surrounding the resin-impregnated part becomes a fiber part where no resin substantially exists.

As the protective film, a polyethylene film which is conventionally used as a protective film is preferably used. However, this film may be altered corresponding to the type of matrix resin taking the adhesion to the matrix resin into account.

The protective film preferably has at least one irregular surface in which, particularly, the convex portions form island portions in the concave portion as a sea portion where each convex portion exists isolatedly. Further, the convex portions are preferably arranged uniformly and regularly.

Also, the area of the convex portions is 1 to 80% and preferably 4 to 50% of the total area of the protective film. Also, the center distance between adjacent convex portions is 1 to 10 mm and preferably 2 to 5 mm.

Specific examples of the present invention and comparative examples will be hereinafter explained.

It is to be noted that in the following examples, a polyethylene embossed film with irregularities on the surface thereof is used as a protective film with irregular surface. In the irregular pattern of the embossed film, rhomboid convex portions having diagonal lengths of 4 mm×2 mm are arranged herringbone-wise at intervals of 0.5 mm.

The area of a resin-impregnated part where the impregnated resin substantially exists was measured in the following manner.

The resulting prepreg was set to the Microscope VH-6000 manufactured by KEYENCE CORPORATION and the field of view was set to 13 mm (width)×13 mm (length) (magnification: 25) to observe the prepreg reflected on a display. The outline of the resin-impregnated part where the impregnated resin substantially exists on the part of 9 mm×7 mm in the filed of view was traced by a cursor on the display to input the outline to a calculator for calculating the total area. It is to be noted that the magnification was set to 25 and a scale was placed within the field of view to calibrate prior to the measurement.

Example 1

An epoxy resin composition having the composition A shown in Table 1 was prepared. This resin was applied uniformly to releasable paper such that the areal weight of the resin was 108 g/m$^2$, to prepare a resin film. Also, a reinforced-fiber sheet was a sheet-like product obtained by arranging carbon fibers (trade name: TR30S, manufactured by Mitsubishi Rayon Co., Ltd., tensile elastic modulus: 235 GPa) in the same direction. The resin film and the reinforced-fiber sheet were used to manufacture a uni-direction prepreg in which the areal weight of carbon fiber (hereinafter referred to as "FAW") was 200 g/m$^2$ and the resin content (hereinafter referred to as "RC") was 35%.

The aforementioned embossed film was applied to the prepreg such that the irregular surface of the embossed film is faced to the surface side of the prepreg, which was then placed in an atmosphere kept at 80° C. for 4 hours.

The resin was penetrated into the inside of the prepreg at the position corresponding to the concave portion of the embossed film on the surface of the resulting prepreg and this position was a fiber part where no resin substantially existed on the surface of the prepreg. Also, the position corresponding to the convex portion of the embossed film on the surface of the prepreg was sufficiently impregnated with the resin and constituted a resin-impregnated part which was resin-rich and the impregnated resin substantially existed. It was confirmed that tacking characteristics allowing laminating works sufficiently were secured in such a prepreg.

Figure 3:
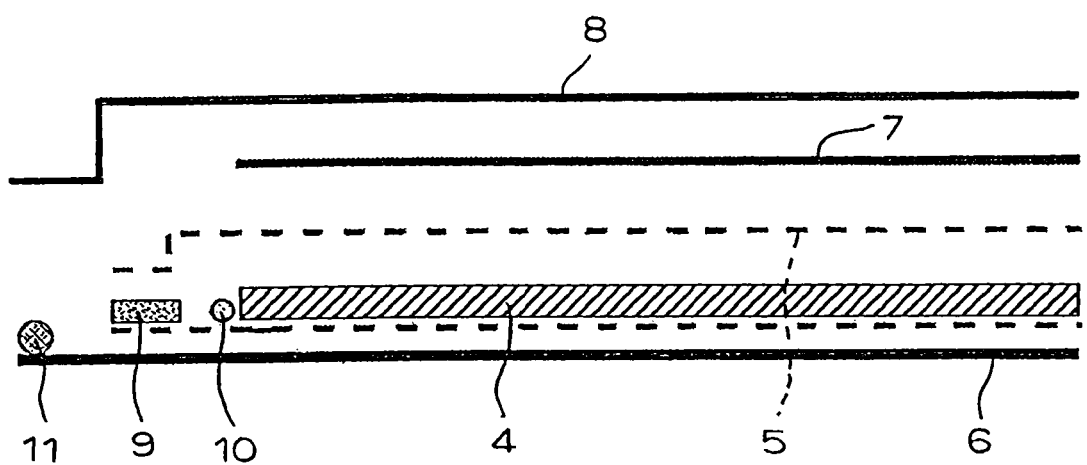
FIG. 3 is an explanatory view showing a bagging method.

As shown in FIG. 3, a releasable film 5 comprising a copolymer of tetrafluoroethylene and ethylene was arranged and laminated on both sides of a prepreg stack 4 obtained by laminating eight prepregs obtained as described above such that the directions of the fibers of these prepregs were −45°/90°/+45°/0°/0°/+45°/90°/−45°, respectively.

This laminate was placed on a base plate 6 comprising a 5-mm-thick aluminum thin plate coated with a releasing agent. Moreover, a surface breather 7 made of glass fiber woven fabric and a bagging film 8 made of nylon were laminated in this order on the upper surface of the laminate, followed by bagging and then cured in the condition shown in FIG. 4.

Here, the periphery of a releasable film 4 arranged on both sides of a prepreg stack 4 except for a part thereof was sealed with a highly viscous resin. A braid 9 made of glass fiber was disposed and a glass yarn 10 was disposed in the inside thereof in the unsealed opening portion to promote the exhaust of air, to draw off the air from the film 4 in advance.

Then, the composite material was sealed with a seal agent 11, leaving all the periphery of the base plate 6 and bagging film 8.

The section of the resulting plate composite material was abraded to observe the section by using an optical microscope at a magnification of 50. However, any void which had an influence on the strength of the composite material was not observed between the layers of the prepreg.

Example 2

A uni-direction prepreg having a FAW of 200 g/m$^2$ and a RC of 35% was manufactured in the same manner as in Example 1 except that an epoxy resin composition was altered to the composition B shown in Table 1. The aforementioned embossed film was applied to the prepreg such that the irregular surface of the embossed film is faced to the surface side of the prepreg, which was then kept in an atmosphere at a temperature of 50° C. for 12 hours.

The obtained prepreg had the same structure as in Example 1 and had good tacking characteristics.

The resulting prepreg was observed by Microscope VH-6000 manufactured by KEYENCE CORPORATION to find that the area ratio of a resin-impregnated part where the impregnated resin substantially exists was 30.4%.

Figure 5:
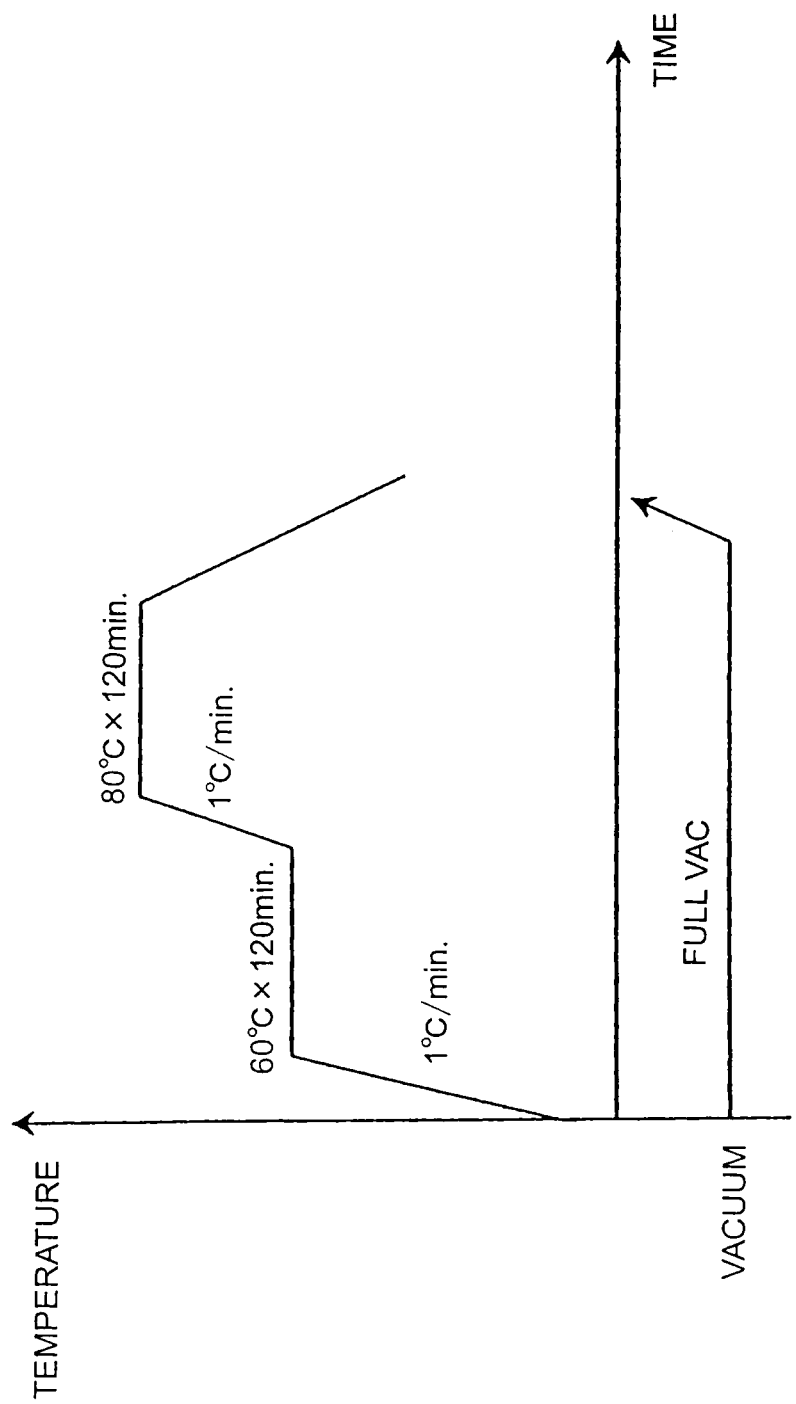
FIG. 5 is a graph showing curing conditions.

Then, the obtained eight prepregs were laminated in the same manner as in Example 1, subjected to bagging carried out as shown in FIG. 3 and cured in the condition shown in FIG. 5.

The section of the resulting plate composite material was abraded to observe the section by using an optical microscope at a magnification of 50. However, any void which had an influence on the strength of the composite material was not observed between the layers of the prepreg.

Example 3

A uni-direction prepreg having a FAW of 200 g/m$^2$ and a RC of 35% was manufactured in the same manner as in Example 1 except that an epoxy resin composition was altered to the composition C shown in Table 1. The aforementioned embossed film was applied to the prepreg such that the irregular surface of the embossed film is faced to the surface side of the prepreg, which was then kept in an atmosphere at a temperature of 130° C. for 10 hours.

The obtained prepreg had the same structure as in Example 1 and had good tacking characteristics.

Then, the obtained eight prepregs were laminated in the same manner as in Example 1, subjected to bagging carried out as shown in FIG. 3 and cured in the condition shown in FIG. 6.

The section of the resulting plate composite material was abraded to observe the section by using an optical microscope at a magnification of 50. However, any void which had an influence on the strength of the composite material was not observed between the layers of the prepreg.

Example 4

An epoxy resin composition having the composition A shown in Table 1 was prepared. This resin was applied uniformly to releasable paper such that the areal weight of the resin was 54 g/m$^2$, to prepare a resin film. Also, a reinforced-fiber sheet obtained by arranging carbon fibers (trade name: TR30S, manufactured by Mitsubishi Rayon Co., Ltd., modulus of elasticity in tension: 235 GPa) sheet-wise in the same directions was put between the above resin films and pressed from both sides thereof. The sheet was heated to manufacture a uni-direction prepreg having a FAW of 200 g/m² and a RC of 35%.

The aforementioned embossed film was applied to the prepreg such that the irregular surface of the embossed film is faced to the surface side of the prepreg, which was then placed in an atmosphere kept at 80° C. for 4 hours.

The obtained prepreg had the same structure as in Example 1 and had good tacking characteristics.

Figure 4:
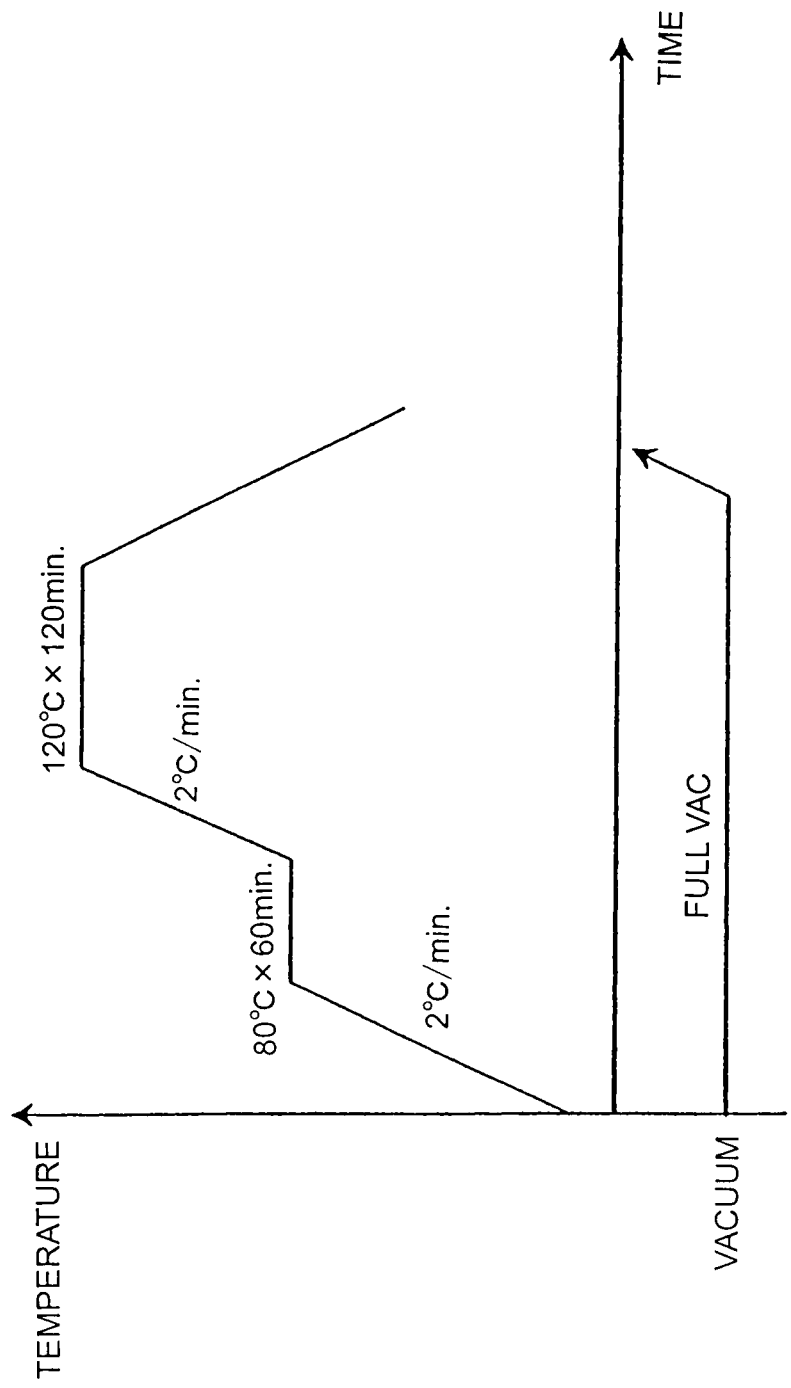
FIG. 4 is a graph showing curing conditions.

Eight prepregs obtained as described above were laminated such that the directions of the fibers of these prepregs were −45°/90°/+45°/0°/0°/+45°/90°/−45°, respectively, subjected to bagging as shown in FIG. 3 and then cured in the condition shown in FIG. 4.

The section of the resulting plate composite material was abraded to observe the section by using an optical microscope at a magnification of 50. However, any void which had an influence on the strength of the composite material was not observed between the layers of the prepreg.

Example 5

An epoxy resin composition having the composition A shown in Table 1 was applied uniformly to releasable paper to prepare a resin film having a resin areal weight of 133 g/m². This resin film and a carbon fiber cloth TR3110 manufactured by Mitsubishi Rayon Co., Ltd. were used to obtain a cloth prepreg in which no resin substantially existed on the surface side and the resin was impregnated locally on the backside, the prepreg having a FAW of 200 g/m² and a RC of 40%.

An embossed film was applied to the surface of the prepreg, which was then kept in an atmosphere at 80° C. for 5 hours. After that, when the embossed film was peeled off, the resin was penetrated into the inside of the prepreg at the position corresponding to the concave portion of the embossed film on the surface of the prepreg and a fiber part where no resin substantially existed was formed on the surface of the prepreg. Also, the position corresponding to the convex portion of the embossed film on the surface of the prepreg was sufficiently impregnated with the resin and constituted a resin-impregnated part which was resin-rich and the impregnated resin substantially existed and the retention of tack enough to carry out a laminating operation was confirmed.

Using the prepregs, an 8-ply prepreg was formed by lamination, subjected to bagging as shown in FIG. 3 and cured in the condition shown in FIG. 4. Then, the section of the composite material was observed, to find that no void was observed between layers.

Comparative Example 1

An epoxy resin composition having the composition A shown in Table 1 was used and applied uniformly to releasable paper such that the areal weight of the resin was 54 g/m², to prepare a resin film. Also, a reinforced-fiber sheet obtained by arranging carbon fibers (trade name: TR30S, manufactured by Mitsubishi Rayon Co., Ltd.) sheet-wise in one direction was put between the above resin films and pressed from both sides thereof to impregnate the sheet with the resin. Thereafter, the upper releasable paper was peeled off to obtain an uni-direction prepreg having a FAW of 200 g/m² and a RC of 35%.

A polyethylene film with a smooth surface was applied to the side of the prepreg to which the releasable paper was not stuck, which was then placed in an atmosphere kept at 80° C. for 5 hours.

In the obtained prepreg, the resin was uniformly impregnated in the inside of the carbon fiber tow and the resin existed uniformly also on the surface of the prepreg. The tack was strong and the surface of the prepreg was sticky.

Using the above prepregs, the polyethylene film with a smooth surface was peeled off and immediately, eight prepregs obtained as described above were laminated such that the directions of the fibers of these prepregs were −45°/90°/+45°/0°/0°/+45°/90°/−45°, respectively, subjected to bagging as shown in FIG. 3 and then cured in the condition shown in FIG. 4.

The section of the resulting plate composite material was abraded to observe the section by using an optical microscope at a magnification of 50. However, a great number of voids was observed between the layers of the prepreg.

Comparative Example 2

A uni-direction prepreg having a FAW of 200 g/m² and a RC of 35% was obtained in the same manner as in Comparative Example 1 except that an epoxy resin composition having the composition B shown in Table 1 was used. A polyethylene film with a smooth surface was applied to the side of the prepreg to which the releasable paper was not stuck, which was then placed in an atmosphere kept at 50° C. for 12 hours.

In the obtained prepreg, the resin was uniformly impregnated in the inside of the carbon fiber tow and the resin existed uniformly also on the surface of the prepreg. The tack was strong and the surface of prepreg was sticky.

The prepregs were treated in the same manner as in Comparative Example 1. Namely, the polyethylene film with a smooth surface was peeled off and immediately, eight prepregs obtained as described above were laminated such that the directions of the fibers of these prepregs were −45°/90°/+45°/0°/0°/+45°/90°/−45°, respectively, subjected to bagging as shown in FIG. 3 and then cured in the condition shown in FIG. 5.

The section of the resulting plate composite material was abraded to observe the section by using an optical microscope at a magnification of 50. However, a great number of voids were observed between the layers of the prepreg.

Comparative Example 3

A prepreg was manufactured in the same manner as in Comparative Example 1 except that an epoxy resin composition having the composition C shown in Table 1 was used. A polyethylene film with a smooth surface was applied to the side of the prepreg to which the releasable paper was not stuck, which was then placed in an atmosphere kept at 130° C. for 10 hours.

In the obtained prepreg, the resin was uniformly impregnated in the inside of the carbon fiber tow and the resin existed uniformly also on the surface of the prepreg. The tack was strong and the surface of prepreg was sticky.

The prepregs were treated in the same manner as in Comparative Example 1. Namely, the polyethylene film with a smooth surface was peeled off and immediately, eight prepregs obtained as described above were laminated such that the directions of the fibers of these prepregs were −45°/90°/+45°/0°/0°/+45°/90°/−45°, respectively, subjected to bagging as shown in FIG. 3 and then cured in the condition shown in FIG. 6.

The section of the resulting plate composite material was abraded to observe the section by using an optical microscope at a magnification of 50. However, a great number of voids were observed between the layers of the prepreg.

Comparative Example 4

An epoxy resin composition having the composition A shown in Table 1 was applied uniformly to releasable paper to prepare a resin film having a resin areal weight of 133 g/m². This resin film and a carbon fiber cloth TR3110 manufactured by Mitsubishi Rayon Co., Ltd. were used to obtain a cloth prepreg in which the entire carbon fiber cloth was impregnated with the resin.

A polyethylene film having a smooth surface without any irregularity was applied to the surface of the prepreg, which was then kept in an atmosphere at 80° C. for 5 hours.

When the film was peeled off from the cloth prepreg obtained in this manner, the entire surface of the prepreg was covered with the resin. The tack was strong and the surface of the prepreg was sticky.

Using the prepregs, an 8-ply prepreg was formed by lamination in the same manner as in Example 4, subjected to bagging as shown in FIG. 3 and cured in the condition shown in FIG. 4. Then, the section of the composite material was observed, to find that many voids were observed between layers.

TABLE 1

| Resin composition | Manufacturer | A | B | C |
|---|---|---|---|---|
| Ep828 | Yuka-Shell Epoxy Co., Ltd. | 60 | 60 | 60 |
| Ep1001 | Yuka-Shell Epoxy Co., Ltd. | 40 | 40 | 40 |
| Dicyanamide | Yuka-Shell Epoxy Co., Ltd. | 5 | | |
| Dichloromethyl urea | HODOGAYA CHEMICAL CO., LTD. | 5 | | |
| HX3613 | Asahi Kasei Epoxy Co., Ltd. | | 10 | |
| Seika Cure S | WAKAYAMA SEIKA KOGYO CO., LTD. | | | 30 |

Unit: Part by weight

The invention claimed is:

1. A method of producing a prepreg comprising:
    impregnating a reinforced-fiber sheet with a matrix resin so as to have a continuous resin layer at least in an inside thereof
    applying a protective film having an irregular surface to at least one surface of one side of the reinforced-fiber sheet impregnated with the matrix resin to form a sea-island structure comprising a resin-impregnated part where an impregnated resin substantially exists and a fiber part where an impregnated resin does not substantially exist on the at least one surface of the impregnated reinforced fiber sheet; and,
    and keeping a temperature at 50 to 130° C. for 4 hours or more in a situation where the protective film is applied to the reinforced-fiber sheet and keeping the viscosity of an impregnated resin at 100 to 10000 Poise or less for 4 hours or more in a situation where the protective film is applied to the reinforced-fiber sheet to distinctly form a resin-impregnated part where an impregnated resin substantially exists and a fiber part where an impregnated resin does not substantially exist on the at least one surface of one side of the reinforced-fiber sheet impregnated with the matrix resin.

2. The method of producing the prepreg according to claim 1, wherein only a convex portion of the irregular surface is brought into contact with the reinforced-fiber sheet impregnated with the matrix resin.

3. The method of producing the prepreg according to claim 1, wherein the irregular surface of the protective film is formed of a number of independent convex portions.

4. The method of producing the prepreg according to claim 3, wherein the irregular surface of the protective film is disposed with dispersing a number of convex portions uniformly on a surface of the film.

5. The method of producing the prepreg according to claim 4 wherein a center distance between the adjacent convex portions is 1 to 10 mm.

6. The method of producing the prepreg according to claim 3 wherein a center distance between the adjacent convex portions is 1 to 10 mm.

7. A method of producing a curable prepreg, comprising:
    impregnating a reinforced-fiber sheet with a matrix resin so as to have a continuous resin layer at least in an inside thereof;
    applying a protective film having an irregular surface to at least one surface of the impregnated reinforced fiber sheet to form a sea-island structure comprising a resin impregnated part where an impregnated resin substantially exists and a fiber part where an impregnated resin does not substantially exist on the at least one surface of the impregnated reinforced fiber sheet; and,
    keeping the temperature of the protected impregnated reinforced-fiber sheet at 50 to 130° C. for 4 hours or more and keeping the viscosity of the matrix resin impregnated in the reinforced-fiber sheet at 100 to 10,000 Poise or less for 4 hours or more in a situation where the protective film is applied to the reinforced-fiber sheet so as to distinctly form a resin-impregnated part where an impregnated resin substantially exists and a fiber art where an impregnated resin does not substantially exist on the at least one surface of one side of the reinforced-fiber sheet impregnated with the matrix resin distinctly.

8. The method of producing the curable prepreg according to claim 7, wherein only a convex portion of the irregular surface is brought into contact with the reinforced-fiber sheet impregnated with the matrix resin during the applying.

9. The method of producing the curable prepreg according to claim 7, wherein the irregular surface of the protective film has a plurality of independent convex portions.

10. The method of producing the curable prepreg according to claim 9, wherein the irregular surface of the protective film is disposed with dispersing a number of convex portions uniformly on a surface of the film.

11. The method of producing the curable prepreg according to claim 9 wherein a center distance between the adjacent convex portions is 1 to 10 mm.

* * * * *